US008029958B2

(12) United States Patent
Qi et al.

(10) Patent No.: US 8,029,958 B2
(45) Date of Patent: Oct. 4, 2011

(54) OVERCOAT LAYER IN PHOTORECEPTIVE DEVICE

(75) Inventors: Yu Qi, Oakville (CA); Nan-Xing Hu, Oakville (CA); Vladislav Skorokhod, Mississauga (CA); Yvan Gagnon, Mississauga (CA); Ah-Mee Hor, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 667 days.

(21) Appl. No.: 12/174,570

(22) Filed: Jul. 16, 2008

(65) Prior Publication Data

US 2010/0015539 A1 Jan. 21, 2010

(51) Int. Cl.
*G03G 15/00* (2006.01)
*G03G 5/00* (2006.01)
*C08L 61/00* (2006.01)

(52) U.S. Cl. ...... 430/66; 430/58.75; 430/58.7; 525/509; 525/510

(58) Field of Classification Search ............... 430/58.05, 430/58.7, 58.75, 58.8, 66; 525/509, 510
See application file for complete search history.

(56) References Cited

U.S. PATENT DOCUMENTS

| | | | | |
|---|---|---|---|---|
| 3,121,006 | A | 2/1964 | Middleton et al. | |
| 4,298,697 | A | 11/1981 | Baczek et al. | |
| 4,338,390 | A | 7/1982 | Lu | |
| 4,560,635 | A | 12/1985 | Hoffend et al. | |
| 2007/0020540 | A1 * | 1/2007 | Qi et al. | 430/58.2 |
| 2007/0048636 | A1 * | 3/2007 | Qi et al. | 430/58.75 |
| 2007/0072101 | A1 * | 3/2007 | Dinh et al. | 430/66 |

* cited by examiner

*Primary Examiner* — Christopher Rodee
*Assistant Examiner* — Stewart Fraser
(74) *Attorney, Agent, or Firm* — Pillsbury Winthrop Shaw Pittman LLP

(57) ABSTRACT

The presently disclosed embodiments are directed to an improved low wear overcoat for an imaging member having a substrate, a charge transport layer, and an overcoat layer positioned on the charge transport layer, and a process for preparing the same, where the overcoat layer includes an aromatic polyol binder, a hole transport molecule, and a melamine formaldehyde curing resin.

17 Claims, 1 Drawing Sheet

OVERCOAT LAYER IN PHOTORECEPTIVE DEVICE

TECHNICAL FIELD

The present disclosure relates generally to layers that are useful in imaging members, such as layered photoreceptor devices, and processes for making and using the same. The imaging members can be used in electrophotographic, electrostatographic, xerographic and like devices, including printers, copiers, scanners, facsimiles, and including digital, image-on-image, and like devices. More particularly, the embodiments pertain to an overcoat layer for a photoreceptive device that includes an aromatic polyol. Overcoat layers of these embodiments provide mechanical strength, flexibility, and reactivity for curing.

BACKGROUND

Electrophotographic imaging members, e.g., photoreceptors, typically include a photoconductive layer formed on an electrically conductive substrate. The photoconductive layer is an insulator in the substantial absence of light so that electric charges are retained on its surface. Upon exposure to light, charge is generated by the photoactive pigment, and under applied field charge moves through the photoreceptor and the charge is dissipated.

In electrophotography, also known as xerography, electrophotographic imaging or electrostatographic imaging, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. Charge generated by the photoactive pigment move under the force of the applied field. The movement of the charge through the photoreceptor selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

An electrophotographic imaging member may be provided in a number of forms. For example, the imaging member may be a homogeneous layer of a single material such as vitreous selenium or it may be a composite layer containing a photoconductor and another material. In addition, the imaging member may be layered. These layers can be in any order, and sometimes can be combined in a single or mixed layer.

Typical multilayered photoreceptors have at least two layers, and may include a substrate, a conductive layer, an optional charge blocking layer, an optional adhesive layer, a photogenerating layer (sometimes referred to as, and used herein interchangeably, a "charge generation layer," "charge generating layer," or "charge generator layer"), a charge transport layer, an optional overcoating layer and, in some belt embodiments, an anticurl backing layer. In the multilayer configuration, the active layers of the photoreceptor are the charge generating layer (CGL) and the charge transport layer (CTL). Enhancement of charge transport across these layers provides better photoreceptor performance.

The term "photoreceptor" or "photoconductor" is generally used interchangeably with the terms "imaging member." The term "electrostatographic" includes "electrophotographic" and "xerographic." The terms "charge transport molecule" are generally used interchangeably with the terms "hole transport molecule." The term "electrostatographic" is generally used interchangeably with the term "electrophotographic." In addition, the terms "charge blocking layer" and "blocking layer" are generally used interchangeably with the phrase "undercoat layer."

There is an intense competitive pressure to improve the performance and lifetime of xerographic photoreceptors. One way to extend the lifetime of drum photoreceptors, such as organic photoconductors (OPC), is to reduce the wear of the photoreceptor surface arising from bias charging roll (BCR) charging and cleaning.

BRIEF SUMMARY

According to embodiments illustrated herein, there is provided an overcoat layer composition for forming an imaging member, the overcoat layer composition comprising a charge transport component, a melamine-formaldehyde curing resin, and an aromatic polyol binder of $Ar\text{-}(L\text{-}OH)_n$, wherein Ar is aromatic hydrocarbon component having from about 6 to about 60 carbons, L is a divalent ether linkage having from about 2 to about 50 carbons, and n is an integer of from 2 to about 6.

According to aspects illustrated herein, there is provided an imaging member comprising a substrate, a charge generating layer disposed on the substrate, a charge transport layer disposed on the charge generating layer, and an overcoat layer disposed on the charge transport layer, wherein the overcoat layer comprises a crosslinked product from an overcoat composition comprising a charge transport component, a melamine-formaldehyde curing resin, and an aromatic polyol binder of $Ar\text{-}(L\text{-}OH)_n$, wherein Ar is aromatic hydrocarbon component having from about 6 to about 60 carbons, L is a divalent ether linkage having from about 2 to about 50 carbons, and n is an integer of from 2 to about 6.

According to further aspects illustrated herein, there is provided an imaging forming apparatus comprising a charging device, a toner developer device, a cleaning device, and a photoreceptor comprising a conductive substrate, a charge generation layer disposed on the substrate, a charge transport layer disposed on the charge generation layer, and an overcoat layer disposed on the charge generation layer, wherein the overcoat layer comprises a charge transport component and a polymer matrix comprised of a melamine-formaldehyde resin crosslinked with an aromatic polyol binder of Ar-(L-OH)n, wherein Ar is aromatic hydrocarbon component having from about 6 to about 60 carbons, L is a divalent linkage, and n is an integer of from 2 to about 6.

BRIEF DESCRIPTION OF THE DRAWINGS

For a better understanding of the present embodiments, reference may be had to the accompanying figures.

DETAILED DESCRIPTION

Figure 1:
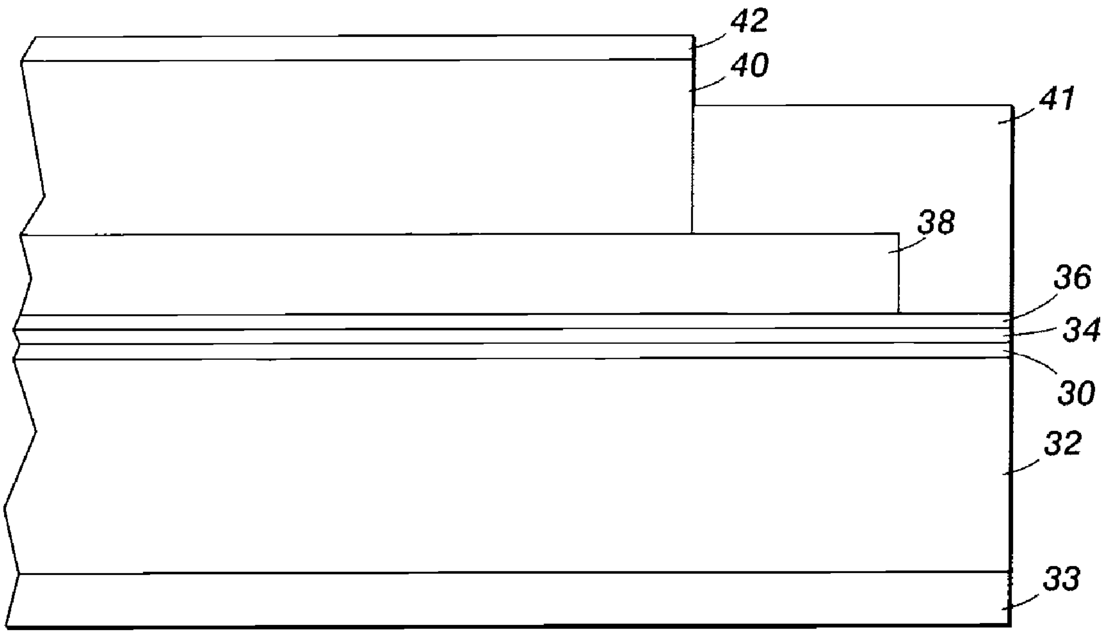
FIG. 1 is a cross-sectional view of a multilayered electrophotographic imaging member according to an embodiment of the present disclosure.

It is understood that other embodiments may be utilized and structural and operational changes may be made without departure from the scope of the embodiments disclosed herein.

The presently disclosed embodiments are directed generally to an improved electrostatographic imaging member having a specific overcoat layer that provides improved wear resistance, while maintaining good photo-induced discharge characteristics, stable electrical cycling, and image quality.

During the xerographic imaging process, the photoreceptor surface is subjected to abrasion due to interactions with toner particles, cleaning devices, and chemical degradation caused by the charging device, in particular when a direct contact charging device, such as bias charge roll (BCR), is utilized, and consequently, the life of the photoreceptor is shortened. One way to extend the service life of the photoreceptors is to reduce the wear of the photoreceptor surface by applying a protective overcoat layer comprised of crosslinked polymer coating with wear resistance. In embodiments, there is provided an overcoat formulation for forming such protective layer, comprising (i) the aromatic polyol as the binder, (ii) a melamine-formaldehyde as the curing agent, and (iii) a charge transport component. The overcoat composition can be applied onto a conventional photoreceptor to form a highly crosslinked protective layer upon thermal curing.

The present embodiments provide a low wear photoreceptor overcoat layer composition or formulation comprising an aromatic polyol as the binder. The binder contains an aromatic core and multi-hydroxyl groups. The aromatic core provides the mechanical strength to the overcoat, the polyether linkage brings in the flexibility and the hydroxyl groups offer the reactivity for curing. The overcoat formulation can be subjected to thermal curing to form a crosslinked product. In this manner, the overcoat formulation can be used to form an overcoat layer that comprises the crosslinked product after thermal curing. In embodiments, the crosslinking is realized by thermal curing in the presence of an acid catalyst comprised of an alkybenzenesulfonic acid or its amine masked derivative.

In further embodiments, the overcoat formulation comprises (i) the aromatic polyether-polyol as the binder, (ii) a melamine-formaldehyde as the curing agent, and (iii) a charge transport component. The charge transport component may contain a chemical group capable of reacting with the curing agent. In further embodiments, the charge transport component is represented by the following general formula

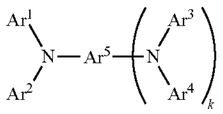

wherein $Ar^1$, $Ar^2$, $Ar^3$, $Ar^4$ and $Ar^5$ each independently represents a substituted or unsubstituted aryl group, or $Ar^5$ independently represents a substituted or unsubstituted arylene group and k represents 0 or 1, wherein at least one of $Ar^1$, $Ar^2$, $Ar^3$ and $Ar^4$ comprises a substituent selected from the group consisting of —OH, $—(CH_2)_mOH$, and $—CH_2OR$, m is an integer of from 1 to about 6, and R is an alkyl having from 1 to about 6 carbons. In specific embodiments, the charge transport component is selected from the group consisting of:

H-1

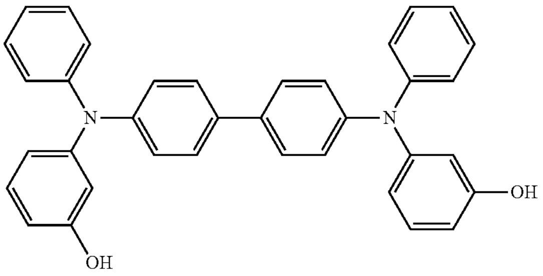

H-2

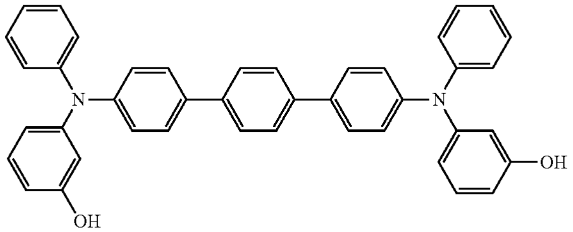

H-3

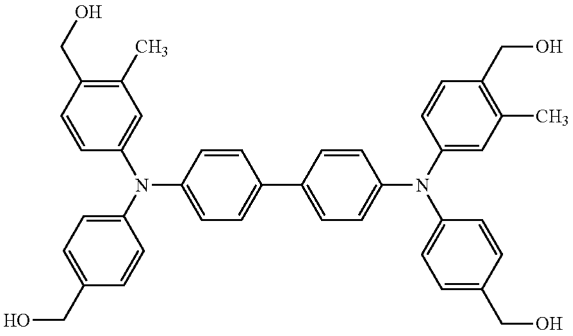

H-4

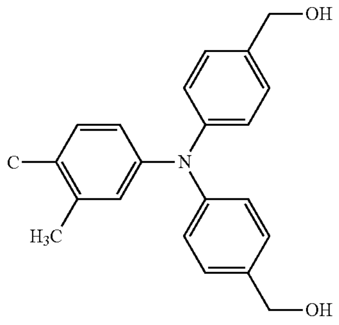

H-5

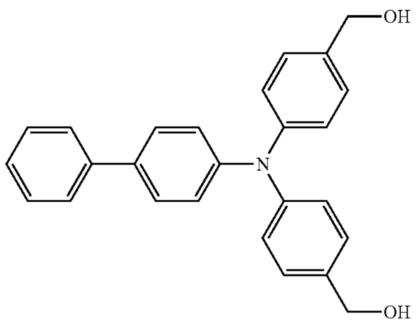

-continued

H-6

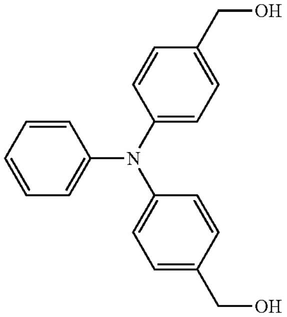

H-7

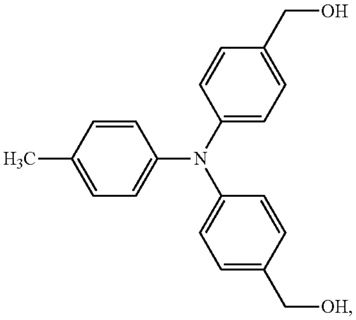

and mixtures thereof. In certain embodiments, the overcoat formulation/composition further comprises a solvent for coating purpose. Illustrative examples of solvent may include alcohols such as methanol, ethanol, propanol, butanol, Dowanol™ from Dow Corning Company and the like, a ketone such as acetone, methyl ethyl ketone and the like, ethyl acetate, toluene, tetrahydrofuran, and the mixture thereof.

In one embodiment, the aromatic polyol binder has a structure Ar-(L-OH)n, wherein Ar is an aromatic hydrocarbon component having from about 6 to about 60 carbons. In specific embodiments, Ar is an aromatic hydrocarbon component selected from the group consisting of:

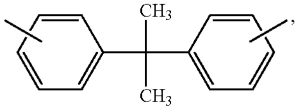

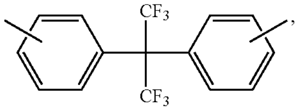

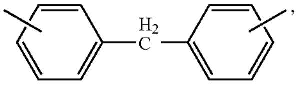

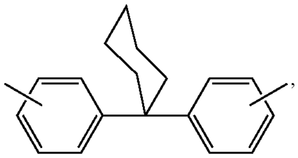

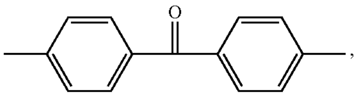

-continued

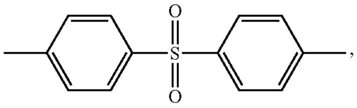

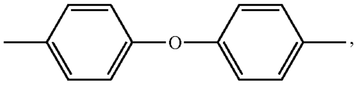

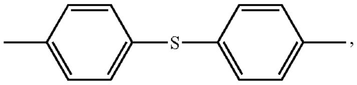

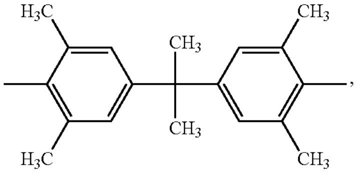

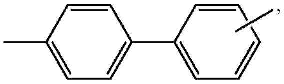

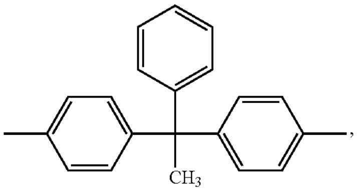

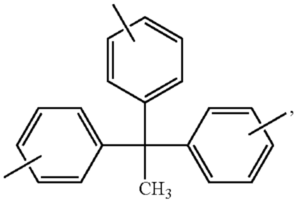

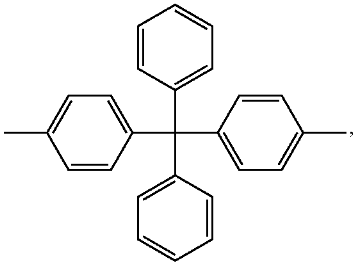

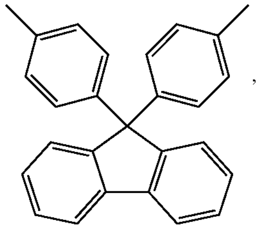

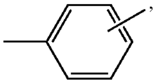

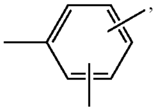

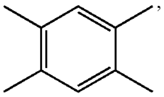

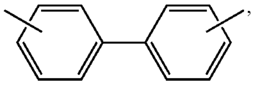

-continued
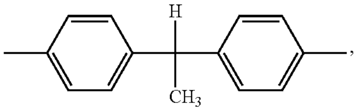,
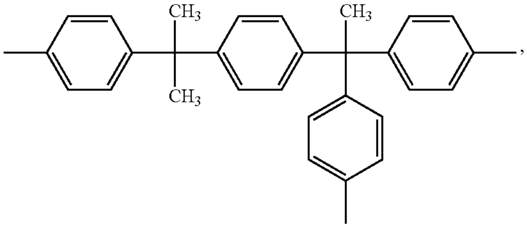,
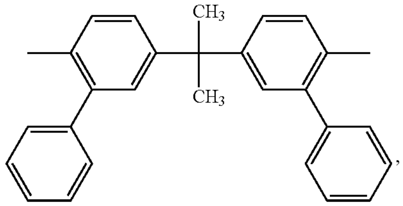,
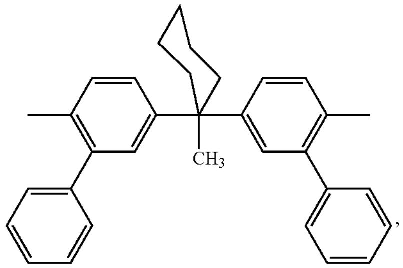,
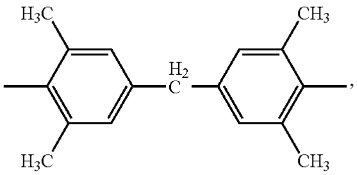,
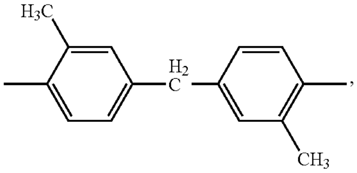,
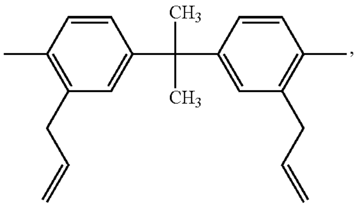,
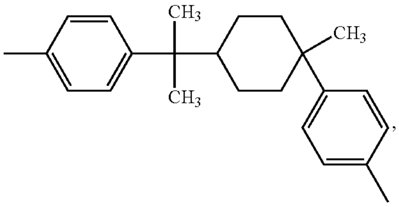,
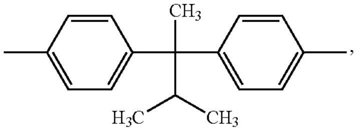,
-continued
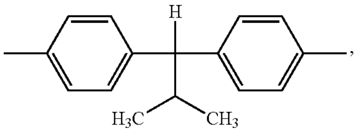,
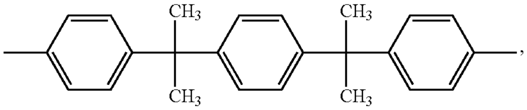,
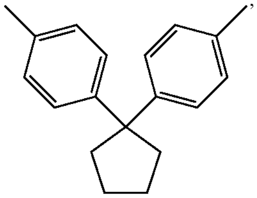,
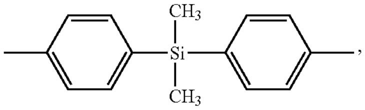,
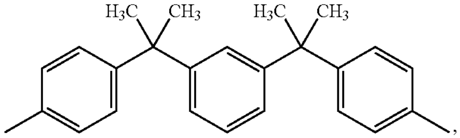,
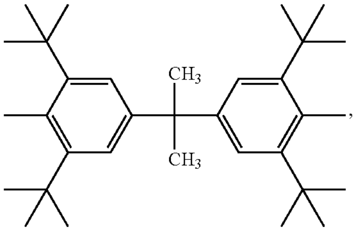,
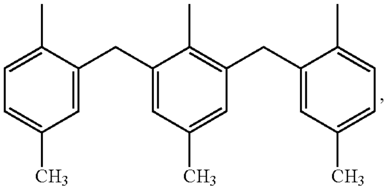, and
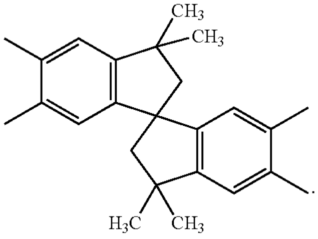.
L is linkage group, e.g. a divalent ether linkage component, having from about 2 to about 50 carbons. For example, L can be selected from the group consisting of:
$—(OCH_2CH_2)_k—$, 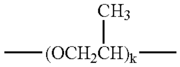,
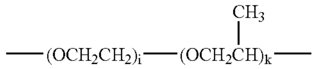,
$—(OCH_2CH_2CH_2)_k—$, and $—(OCH_2CH_2CH_2CH_2)_k—$.

wherein k and i are each an integer from 1 to about 10. In specific embodiments, n is an integer of from about 2 to about 6.

In certain embodiments, the aromatic polyol binder is selected from the group consisting of:

A-1

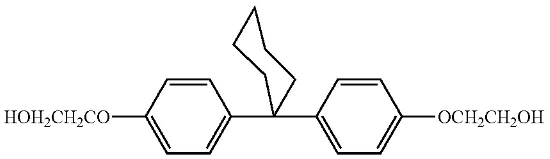

A-2

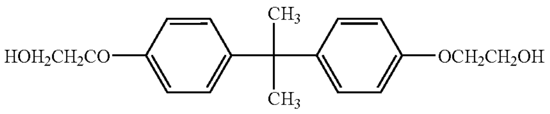

A-3

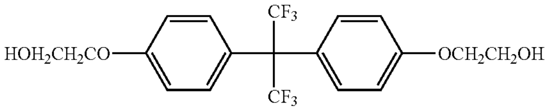

A-4

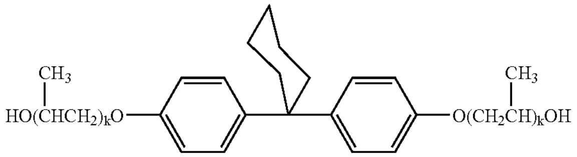

A-5

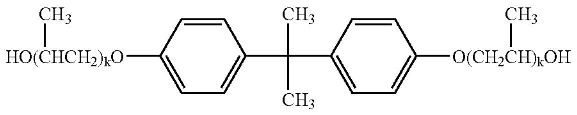

A-6

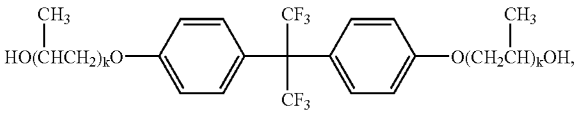

and mixtures thereof, and wherein k is an integer of from 1 to about 3.

The aromatic polyol binders may be prepared according to any conventional synthetic procedures. For instance, they may be prepared by reacting a multi-phenol compound with ethylene or propylene oxides, or with haloalkyl alcohol. In specific embodiments, certain binder compounds of the present invention can be formed from the following scheme, where Ar is as described above:

Scheme 1.

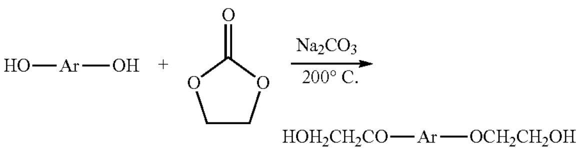

In this scheme, the phenol compound is reacted with ethylene carbonate in the presence of a catalyst such as sodium carbonate at about 150 to about 250° C. The resulting product may be re-precipitated in deionized water, methanol, or mixture thereof, to remove the catalyst and un-reacted materials. Any other purification methods for the product may also be used.

In embodiments, the overcoat composition includes a crosslinking agent, for example, a melamine crosslinking agent. Incorporation of a crosslinking agent can provide reaction sites to interact with the aromatic polyol to provide a crosslinked structure. Illustrative examples of melamine curing agent include, but not limited to, melamine formaldehyde resin, glycouril-formaldehyde resins, benzoguanamine-formaldehyde resins, and the like. In some embodiments, the melamine crosslinking agent can include a methylated, butylated melamine-formaldehyde resins. Commercially available melamine resins, such as those under a trade name of CYMEL® resins (available from Cytec Industries), may be utilized. In certain embodiments, the melamine-formaldehyde curing resin is represented by the formula of

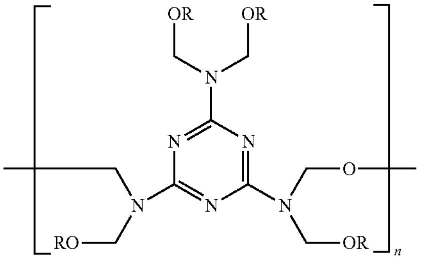

wherein R is selected from the group consisting of a hydrogen, a methyl, an ethyl, an propyl, a butyl, and mixtures thereof and n is the number of repeating unit selected from 1 to about 100.

In embodiments, the overcoat formulation/composition may further comprises an acid catalyst to facilitate the curing chemistry. Crosslinking can be accomplished by heating the overcoating components in the presence of a catalyst. Non-limiting examples of catalysts include oxalic acid, maleic acid, carbolic acid, ascorbic acid, malonic acid, succinic acid, tartaric acid, citric acid, benzenesulfonic acid, alkylbenzenesulfonic acid having an alkyl substituent of from 1 to about 16 carbons, methanesulfonic acid, and the like. A blocking agent can also be included in the overcoat composition, which agent can "tie up" or substantially block the acid catalyst effect to provide solution stability until the acid catalyst function is desired. Thus, for example, the blocking agent can block the acid effect until the solution temperature is raised above a threshold temperature. For example, some blocking agents can be used to block the acid effect until the solution temperature is raised above about 100° C. At that time, the blocking agent dissociates from the acid and vaporizes. The unassociated acid is then free to catalyze the polymerization. Examples of such suitable blocking agents include, but are not limited to, pyridine and commercial acid solutions containing blocking agents such as CYCAT®4045, available from Cytec Industries Inc.

The overcoat composition can be applied via any coating techniques onto a photoreceptor substrate, such as spay coating, blade coating, dip-coating and the like, followed by thermal curing to form an overcoat layer with a thickness ranging from about 1 micron to about 15 microns. The overcoat layer thus formed comprises a charge transport component in an amount of from about 25 to about 90, or from about 45 to about 85 percent by weight of the total weight of the overcoat layer. The temperature used for curing varies with the specific catalyst, the catalyst amount, heating time utilized, and the degree of crosslinking desired. Generally, the degree of crosslinking selected depends upon the desired flexibility of the final photoreceptor. For example, substantially crosslinking may be used for rigid drum or plate photoreceptors. However, partial crosslinking is usually selected for flexible photoreceptors having, for example, web or belt configurations. The amount of catalyst to achieve a desired degree of crosslinking will vary depending upon the specific coating solution materials, such as type of catalyst, temperature, and time used for the reaction. Specifically, the overcoat composition is crosslinked at a temperature between about 100° C. and about 150° C. (between includes all values from about to about). The curing time can range, for example, about 1 minute to about 40 minutes. A typical concentration of acid catalyst is from about 0.01 to about 5 weight percent based on the total weight of aromatic polyol binder, the charge transport component, and the curing agent. The crosslinked overcoat layer should be substantially insoluble in the solvent in which it was soluble prior to crosslinking, thus permitting no overcoat material to be removed when rubbed with a cloth soaked in the solvent.

According to embodiments herein, an electrophotographic imaging member is provided, which generally comprises at least a substrate layer, an imaging layer disposed on the substrate. The overcoat layer of the present invention is disposed on the imaging layer. The imaging member includes, as imaging layers, a charge transport layer and a charge generating layer. In a specific embodiment, the substrate comprises a metal cylinder or a metalized polymer, the charge generating layer comprises a photosensitive pigment and an optional polymer binder, and the charge transport layer comprises a polycarbonate polymer binder and at least one charge transport material comprised of a tertiary arylamine.

The imaging member can be employed in the imaging process of electrophotography, where the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. The radiation selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

In a typical electrostatographic reproducing apparatus such as electrophotographic imaging system using a photoreceptor, a light image of an original to be copied is recorded in the form of an electrostatic latent image upon an imaging member and the latent image is subsequently rendered visible by the application of a developer mixture. The developer, having toner particles contained therein, is brought into contact with the electrostatic latent image to develop the image on an electrostatographic imaging member which has a charge-retentive surface. The developed toner image can then be transferred to a copy substrate, such as paper, that receives the image via a transfer member.

Alternatively, the developed image can be transferred to another intermediate transfer device, such as a belt or a drum, via the transfer member. The image can then be transferred to the paper by another transfer member. The toner particles may be transfixed or fused by heat and/or pressure to the paper. The final receiving medium is not limited to paper. It can be various substrates such as cloth, conducting or non-conducting sheets of polymer or metals. It can be in various forms, sheets or curved surfaces. After the toner has been transferred to the imaging member, it can then be transfixed by high pressure rollers or fusing component under heat and/or pressure.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, a photoreceptor is charged on its surface by means of an electrical charger to which a voltage has been supplied from power supply. The photoreceptor is then imagewise exposed to light from an optical system or an image input apparatus, such as a laser and light emitting diode, to form an electrostatic latent image thereon. Generally, the electrostatic latent image is developed by bringing a developer mixture from developer station into contact therewith. Development can be effected by use of a magnetic brush, powder cloud, or other known development process.

After the toner particles have been deposited on the photoconductive surface, in image configuration, they are transferred to a copy sheet by transfer means, which can be pressure transfer or electrostatic transfer. In embodiments, the developed image can be transferred to an intermediate transfer member and subsequently transferred to a copy sheet.

Figure 2:
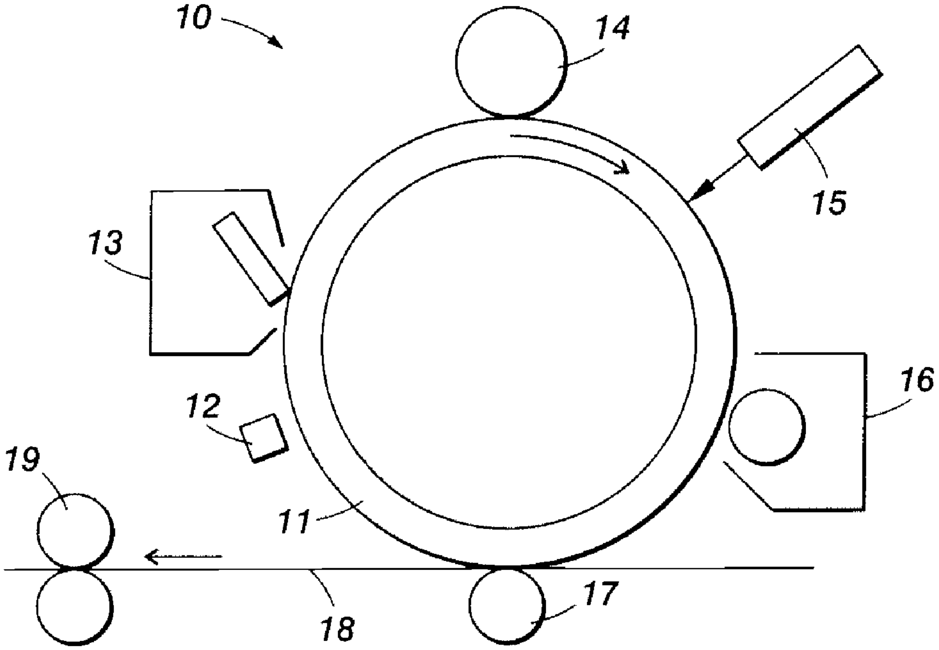
FIG. 2 is a schematic nonstructural view showing an embodiment of the electrophotographic image forming apparatus of the present disclosure.

FIG. 2 shows a schematic constitution of an embodiment of an image forming apparatus 10. The image forming apparatus 10 is equipped with an imaging member 11, such as a cylindrical photoreceptor drum, having a charge retentive surface to receive an electrostatic latent image thereon. Around the imaging member 11 may be disposed a static eliminating light source 12 for eliminating residual electrostatic charges on the imaging member 11, an optional cleaning blade 13 for removing the toner remained on the imaging member 11, a charging component 14, such as a charger roll, for charging the imaging member 11, a light-exposure laser optical system 15 for exposing the imaging member 11 based on an image signal, a development component 16 to apply developer material to the charge-retentive surface to create a developed image in the imaging member 11, and a transfer component 17, such as a transfer roll, to transferring a toner image from the imaging member 11 onto a copy substrate 18, such as paper, in this order. Also, the image forming apparatus 10 is equipped with a fusing component 19, such as a fuser/fixing roll, to fuse the toner image transferred onto the copy substrate 18 from the transfer component 17.

In the embodiment shown in FIG. 2, the light exposure laser optical system 15 is equipped with a laser diode (for example, oscillation wavelength 780 nm) for irradiating a laser light based on an image signal subjected to a digital treatment, a polygon mirror polarizing the irradiated laser light, and a lens system of moving the laser light at a uniform velocity with a definite size.

After the transfer of the developed image is completed, the copy sheet advances to fusing station 19, depicted in FIG. 2 as fusing and pressure rolls, wherein the developed image is fused to copy sheet by passing copy sheet between the fusing member and pressure member, thereby forming a permanent image. Fusing may be accomplished by other fusing members such as a fusing belt in pressure contact with a pressure roller, fusing roller in contact with a pressure belt, or other like systems. The photoreceptor, subsequent to transfer, may advance to a cleaning station, wherein any toner left on the photoreceptor is cleaned therefrom by use of a blade, brush, or other cleaning apparatus.

Electrophotographic imaging members may be prepared by any suitable technique. Referring to FIG. 1, typically, a flexible or rigid substrate 32 is optionally provided with an electrically conductive surface or coating 30. An optional undercoat layer 34 can also be applied over the conductive layer, as well as an optional adhesive layer 36 over the undercoat layer 34. The charge generating layer 38 is illustrated between an adhesive layer 36 and a charge transport layer 40. An optional ground strip layer 41 operatively connects the charge generating layer 38 and the charge transport layer 40 to the conductive layer 30. An anticurl back coating layer 33 may be applied to the side of the substrate 32 opposite from the electrically active layers to render desired imaging member flatness. Other layers of the imaging member may also include, for example, an optional overcoat layer 42 directly over the charge transport layer 40 to provide protection against abrasion and wear.

The conductive ground plane 30 over the substrate 32 is typically a thin, metallic layer, for example a 10 nanometer thick titanium coating, which may be deposited over the substrate by vacuum deposition or sputtering processes. The layers 34, 36, 38, 40 and 42 may be separately and sequentially deposited onto the surface of the conductive ground plane 30 of substrate 32 as wet coating layers of solutions comprising one or more solvents, with each layer being completely dried before deposition of the subsequent coating layer. The anticurl back coating layer 33 may also be solution coated, but is applied to the back side of substrate 32, to balance the curl and render imaging member flashes.

Substrate

The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, and the like which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material.

In embodiments where the substrate layer is not conductive, the surface thereof may be rendered electrically conductive by an electrically conductive coating 30. The conductive coating may vary in thickness over substantially wide ranges depending upon the optical transparency, degree of flexibility needed, and economic factors. Accordingly, for a flexible photoresponsive imaging device, the thickness of the conductive coating may be between about 20 angstroms to about 750 angstroms, or from about 100 angstroms to about 200 angstroms for an optimum combination of electrical conductivity, flexibility and light transmission. The flexible conductive coating may be an electrically conductive metal layer formed, for example, on the substrate by any suitable coating technique, such as a vacuum depositing technique or electrodeposition. Typical metals include aluminum, zirconium, niobium, tantalum, vanadium and hafnium, titanium, nickel, stainless steel, chromium, tungsten, molybdenum, and the like.

Illustrative examples of substrate layers selected for the imaging members may be opaque or substantially transparent, and may comprise any suitable material having the requisite mechanical properties. Thus, the substrate may comprise a layer of insulating material including inorganic or organic polymeric materials, such as MYLAR a commercially available polymer, MYLAR-containing titanium, a layer of an organic or inorganic material having a semiconductive surface layer, such as indium tin oxide, or aluminum arranged thereon, or a conductive material inclusive of aluminum, aluminized polyethylene terephthalate, titanized polyethylene chromium, nickel, brass or the like. The substrate may be flexible, seamless, or rigid, and may have a number of many different configurations, such as for example a plate, a cylindrical drum, a scroll, an endless flexible belt, and the like. In one embodiment, the substrate is in the form of a seamless flexible belt. The anticurl back coating is applied to the back of the substrate. The electrically insulating or conductive substrate may be in the form of an endless flexible belt, a web, a rigid cylinder, a sheet and the like.

The thickness of the substrate layer depends on many factors, including economical considerations, thus this layer may be of substantial thickness, for example over 3,000 microns, or of minimum thickness providing there are no significant adverse effects on the member. In embodiments, the thickness of this layer is from about 75 microns to about 300 microns. For a drum, this layer may be of substantial thickness of, for example, up to many centimeters or of a minimum thickness of less than a millimeter. Similarly, a flexible belt may be of substantial thickness, for example, about 250 micrometers, or of minimum thickness less than 50 micrometers, provided there are no adverse effects on the final electrophotographic device.

Adhesive Layer

An optional adhesive layer 36 may be applied to the hole-blocking layer (not shown) or the conductive layer. Any suitable adhesive layer well known in the art may be used. Typical adhesive layer materials include, for example, polyesters, polyurethanes, blends of resins, and the like. Any suitable solvent may be selected in embodiments to form an adhesive layer coating solution. Typical solvents include, but are not limited to, for example, tetrahydrofuran, toluene, hexane, cyclohexane, cyclohexanone, methylene chloride, 1,1,2-trichloroethane, monochlorobenzene, and mixtures thereof, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the hole blocking layer include spraying, dip coating, roll coating, wire wound rod coating, gravure coating, Bird applicator coating, and the like, Drying of the deposited coating may be effected by any suitable conventional technique such as oven drying, infrared radiation drying, air drying and the like.

At least one electrophotographic imaging layer 38, 40 is formed on the adhesive layer 36, blocking layer (or undercoat or hole blocking layer) 34 or substrate 32. The electrophotographic imaging layer may be a single layer that performs both charge-generating and charge transport functions as is well known in the art, or it may comprise multiple layers such as a charge generator layer 38 and charge transport layer 40.

Undercoat Layer

An undercoat layer 34 or hole blocking layer may be applied to the substrate or coating the substrate may contain thereover an undercoat layer in some embodiments, including known undercoat layers, such as suitable phenolic resins, phenolic compounds, mixtures of phenolic resins and phenolic compounds, titanium oxide, silicon oxide mixtures like $TiO_2/SiO_2$.

In embodiments, the undercoat layer may also contain a binder component. Examples of the binder component include, but are not limited to, polyamides, vinyl chlorides, vinyl acetates, phenolic resins, polyurethanes, aminoplasts, melamine resins, benzoguanamine resins, polyimides, polyethylenes, polypropylenes, polycarbonates, polystyrenes, acrylics, styrene acrylic copolymers, methacrylics, vinylidene chlorides, polyvinyl acetals, epoxys, silicones, vinyl chloride-vinyl acetate copolymers, polyvinyl alcohols, polyesters, polyvinyl butyrals, nitrocelluloses, ethyl celluloses, caseins, gelatins, polyglutamic acids, starches, starch acetates, amino starches, polyacrylic acids, polyacrylamides, zirconium chelate compounds, titanyl chelate compounds, titanyl alkoxide compounds, organic titanyl compounds, silane coupling agents, and combinations thereof. In embodiments, the binder component comprises a member selected from the group consisting of phenolic-formaldehyde resin, melamine-formaldehyde resin, urea-formaldehyde resin, benzoguanamine-formaldehyde resin, glycoluril-formaldehyde resin, acrylic resin, styrene acrylic copolymer, and mixtures thereof. In embodiments, the melamine resin is selected from the group consisting of a melamine-formaldehyde resin, a guanamine-formaldehyde resin, and a melamine-phenol-formaldehyde resin.

In embodiments, the undercoat layer may contain an optional light scattering particle. In various embodiments, the light scattering particle has a refractive index different from the binder and has a number average particle size greater than about 0.8 μm. In various embodiments, the light scattering particle is amorphous silica P-100 commercially available from Espirit Chemical Co. In various embodiments, the light scattering particle is present in an amount of about 0% to about 10% by weight of a total weight of the undercoat layer.

In embodiments, the undercoat layer may contain various colorants. In various embodiments, the undercoat layer may contain organic pigments and organic dyes, including, but not limited to, azo pigments, quinoline pigments, perylene pigments, indigo pigments, thioindigo pigments, bisbenzimidazole pigments, phthalocyanine pigments, quinacridone pigments, quinoline pigments, lake pigments, azo lake pigments, anthraquinone pigments, oxazine pigments, dioxazine pigments, triphenylmethane pigments, azulenium dyes, squalium dyes, pyrylium dyes, triallylmethane dyes, xanthene dyes, thiazine dyes, and cyanine dyes. In various embodiments, the undercoat layer may include inorganic materials, such as amorphous silicon, amorphous selenium, tellurium, a selenium-tellurium alloy, cadmium sulfide, antimony sulfide, titanium oxide, tin oxide, zinc oxide, and zinc sulfide, and combinations thereof.

In embodiments, the thickness of the undercoat layer may be from about 0.1 μm to 30 μm.

Any suitable and conventional blocking layer capable of forming an electronic barrier to holes between the adjacent photoconductive layer (or electrophotographic imaging layer 8) and the underlying conductive surface 30 of substrate 32 may be used as a hole blocking layer.

Charge Generation Layer

The charge generating layer 38 can be applied to the electrically conductive surface, or on other surfaces in between the substrate 32 and charge generating layer 32. A charge blocking layer or hole-blocking layer 34 may optionally be applied to the electrically conductive surface prior to the application of a charge generating layer 38. An adhesive layer 36 may be used between the charge blocking or hole-blocking layer 34 and the charge generating layer 38. Usually, the charge generation layer 38 is applied onto the blocking layer 34 and a charge transport layer 40, is formed on the charge generation layer 38. This structure may have the charge generation layer 38 on top of or below the charge transport layer 40.

Charge generator layers may comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge-generator layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers using infrared exposure systems. Infrared sensitivity is required for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, titanium oxide phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on photogeneration.

Any suitable polymeric film forming binder material may be employed as the matrix in the charge-generating (photogenerating) binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts. Generally, however, from about 5 percent by volume to about 90 percent by volume of the photogenerating pigment is dispersed in about 10 percent by volume to about 95 percent by volume of the resinous binder, or from about 20 percent by volume to about 30 percent by volume of the photogenerating pigment is dispersed in about 70 percent by volume to about 80 percent by volume of the resinous binder composition. In one embodiment, about 8 percent by volume of the photogenerating pigment is dispersed in about 92 percent by volume of the resinous binder composition. The photogenerator layers can also fabricated by vacuum sublimation in which case there is no binder.

Any suitable and conventional technique may be used to mix and thereafter apply the photogenerating layer coating mixture. Typical application techniques include spraying, dip coating, roll coating, wire wound rod coating, vacuum sublimation, and the like. For some applications, the generator layer may be fabricated in a dot or line pattern. Removing of the solvent of a solvent coated layer may be effected by any suitable conventional technique such as oven drying, infrared radiation drying, air drying and the like.

Generally, the thickness of the charge generating layer depends on a number of factors, including the thicknesses of the other layers and the amount of photogenerator material or pigment contained in the charge generating layers. Accordingly, this layer can be of a thickness of, for example, from about 0.05 micron to about 5 microns, or from about 0.25 micron to about 2 microns when, for example, the pigments are present in an amount of from about 30 to about 75 percent by volume. The maximum thickness of this layer in embodiments is dependent primarily upon factors, such as photosensitivity, electrical properties and mechanical considerations. The charge generating layer binder resin present in various suitable amounts, for example from about 1 to about 50 or from about 1 to about 10 weight percent, may be selected from a number of known polymers, such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like.

Charge Transport Layer

The charge transport layer 40 may comprise a charge transporting small molecule dissolved or molecularly dispersed in a film forming electrically inert polymer such as a polycarbonate. The term "dissolved" as employed herein is defined herein as forming a solution in which the small molecule is dissolved in the polymer to form a homogeneous phase. The expression "molecularly dispersed" is used herein is defined as a charge transporting small molecule dispersed in the polymer, the small molecules being dispersed in the polymer on a molecular scale. Any suitable charge transporting or electrically active small molecule may be employed in the charge transport layer of this invention. The expression charge transporting "small molecule" is defined herein as a monomer that allows the free charge photogenerated in the transport layer to be transported across the transport layer. Typical charge transporting small molecules include, for example, pyrazolines such as 1-phenyl-3-(4'-diethylamino styryl)-5-(4"-diethylamino phenyl)pyrazoline, diamines such as N,N'-diphenyl-N,N-bis(3-methylphenyl)-(1,1'-biphenyl)-4,4'-diamine, hydrazones such as N-phenyl-N-methyl-3-(9-ethyl)carbazoyl hydrazone and 4-diethyl amino benzaldehyde-1,2-diphenyl hydrazone, and oxadiazoles such as 2,5-bis(4-N,N'-diethylaminophenyl)-1,2,4-oxadiazole, stilbenes and the like. As indicated above, suitable electrically active small molecule charge transporting compounds are dissolved or molecularly dispersed in electrically inactive polymeric film forming materials. A small molecule charge transporting compound that permits injection of holes from the pigment into the charge generating layer with high efficiency and transports them across the charge transport layer with very short transit times is N,N'-diphenyl-N,N'-bis(3-methylphenyl)-(1,1'-biphenyl)-4,4'-diamine (TPD). Further hole transport compounds may include N,N'-diphenyl-N,N'-bis(3-methylphenyl)-(1,1'-biphenyl)-4,4'-diamine, N,N,N'N'-tetra(4-methylphenyl)-(1,1'-biphenyl)-4,4'-diamine, N,N'-bis(4-butylphenyl)-N,N'-di-p-tolyl-[p-terphenyl]-4,4"-diamine, or N,N'-bis(4-butylphenyl)-N,N'-di-m-tolyl-[p-terphenyl]-4,4"-diamine.

The charge transport material in the charge transport layer may comprise a polymeric charge transport material or a combination of a small molecule charge transport material and a polymeric charge transport material.

Any suitable electrically inactive resin binder insoluble in the alcohol solvent may be employed in the charge transport layer of this invention. Typical inactive resin binders include polycarbonate resin (such as MAKROLON), polyester, polyarylate, polyacrylate, polyether, polysulfone, and the like. Molecular weights can vary, for example, from about 20,000 to about 150,000. Examples of binders include polycarbonates such as poly(4,4'-isopropylidene-diphenylene)carbonate (also referred to as bisphenol-A-polycarbonate, poly(4,4'-cyclohexylidinediphenylene) carbonate (referred to as bisphenol-Z polycarbonate), poly(4,4'-isopropylidene-3,3'-dimethyl-diphenyl)carbonate (also referred to as bisphenol-C-polycarbonate) and the like. Any suitable charge transporting polymer may also be used in the charge transporting layer of this invention. The charge transporting polymer should be insoluble in the alcohol solvent employed to apply the overcoat layer of this invention. These electrically active charge transporting polymeric materials should be capable of supporting the injection of photogenerated holes from the charge generation material and be capable of allowing the transport of these holes there through.

Any suitable and conventional technique may be used to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infrared radiation drying, air drying and the like.

Generally, the thickness of the charge transport layer is between about 10 and about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers can be maintained from about 2:1 to 200:1 and in some instances as great as 400:1. The charge transport layer, is substantially non-absorbing to visible light or radiation in the region of intended use but is electrically "active" in that it allows the injection of photogenerated holes from the photoconductive layer, i.e., charge generation layer, and allows these holes to be transported through itself to selectively discharge a surface charge on the surface of the active layer.

Overcoat Layer

In embodiments, an overcoat layer 42 is coated on the charge-transporting layer 40. As discussed above, the overcoat layer 42 comprises a crosslinked product from an overcoat composition comprising a charge transport component, a melamine-formaldehyde curing resin, and an aromatic polyol binder of Ar-(L-OH)$_n$, wherein Ar is aromatic hydrocarbon component having from about 6 to about 60 carbons, L is a divalent ether linkage having from about 2 to about 50 carbons, and n is an integer of from 2 to about 6. The specifics of the overcoat layer are discussed above.

Various exemplary embodiments encompassed herein include a method of imaging which includes generating an electrostatic latent image on an imaging member, developing a latent image, and transferring the developed electrostatic image to a suitable substrate.

Also, encompassed herein are methods of imaging and printing with the photoresponsive devices illustrated herein. These methods generally involve the formation of an electrostatic latent image on the imaging member, followed by developing the image with a toner composition comprised, for example, of thermoplastic resin, colorant, such as pigment, charge additive, and surface additives, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

In a selected embodiment, an image forming apparatus for forming images on a recording medium comprising: a) an imaging member having a charge retentive-surface for receiving an electrostatic latent image thereon, wherein the imaging member comprises a substrate, a charge generating layer disposed on the substrate, and at least one charge transport layer disposed on the charge generating layer; b) a development component for applying a developer material to the charge-retentive surface to develop the electrostatic latent image to form a developed image on the charge-retentive surface; c) a transfer component for transferring the developed image from the charge-retentive surface to a copy substrate; and d) a fusing component for fusing the developed image to the copy substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Preparation of Binder Materials for Overcoat Layer

Example 1

Preparation of 2,2'-[4,4'-cyclohexylidene bisphenoxy]diethanol (binder A-1): In a 250-mL round bottomed flask, a mixture of bisphenol Z (26.835 g), ethylene carbonate (18.32 g) and sodium carbonate (0.05 g) was placed. The mixture was heated to 200° C. for 4 hours and cooled to room temperature. The resulting product was dissolved in methanol (300 mL) and precipitated in distilled ionized water (600 mL). Washing with distilled ionized water twice, filtering and drying in an oven at 40° C. overnight gave 27.5 g (77.2%) of product. Proton nuclear magnetic resonance spectroscopy (NMR) spectra confirmed the desired structure of the product.

Example 2

Preparation of 2,2-bis(4-hydroxyethyloxyphenyl)propane (binder A-2): In a 250-mL round-bottomed flask, a mixture of bisphenol A (22.829 g), ethylene carbonate (18.32 g), and sodium carbonate (0.036 g) was placed. The mixture was heated to about 150° C. for 4 hours and thin layer chromatography showed that the reaction did not complete. The temperature was increased to about 190°-200° C. and the reaction was carried on for 3 hours, then cooled to room temperature. The resulting product was dissolved in methanol (300 mL) and precipitated in distilled ionized water (600 L). Washing with distilled ionized water twice, filtering and drying in an oven at 40° C. overnight gave 23.6 g (74.7%) of product. NMR spectra confirmed the desired structure of the product.

Fabrication of Photoreceptor Devices

Example 3

An electrophotographic photoreceptor was fabricated in the following manner: A coating solution for an undercoat layer comprising 100 parts of a zirconium compound (trade name: Orgatics ZC540), 10 parts of a silane compound (trade name: A 110, manufactured by Nippon Unicar Co., Ltd), 400 parts of isopropanol solution and 200 parts of butanol was prepared. The coating solution was applied onto a cylindrical aluminum (Al) substrate subjected to honing treatment by dip coating, and dried by heating at 150° C. for 10 minutes to form an undercoat layer having a film thickness of 0.1 micrometer.

A 0.5 micron thick charge generating layer was subsequently dip coated on top of the undercoat layer from a dispersion of Type V hydroxygallium phthalocyanine (12 parts), alkylhydroxy gallium phthalocyanine (3 parts), and a vinyl chloride/vinyl acetate copolymer, VMCH (Mn=27,000, about 86 weight percent of vinyl chloride, about 13 weight percent of vinyl acetate and about 1 weight percent of maleic acid) available from Dow Chemical (10 parts), in 475 parts of n-butylacetate.

Subsequently, a 25 μm thick charge transport layer (CTL) was dip coated on top of the charge generating layer from a solution of N,N'-diphenyl-N,N'-bis(3-methylphenyl)-1,1'-biphenyl-4,4'-diamine (82.3 parts), 2.1 parts of 2,6-di-tert-butyl-4-methylphenol (BHT) from Aldrich and a polycarbonate, PCZ-400 [poly(4,4'-dihydroxy-diphenyl-1-1-cyclohexane), $M_w$=40,000] available from Mitsubishi Gas Chemical Company, Ltd. (123.5 parts) in a mixture of 546 parts of tetrahydrofuran (THF) and 234 parts of monochlorobenzene. The CTL was dried at 115° C. for 60 minutes.

An overcoat formulation was prepared as follows: a mixture of 2,2'-[4,4'-cyclohexylidene bisphenoxy]diethanol (1 part, binder A-1 prepared according to Example 1), a melamine-formaldehyde resin (1.4 parts, Cymel 303 from Cytec Industries), a phenolic charge transport component of N,N'-bis(3-hydroxyphenyl)-N,N'-diphenyl-1,1'-biphenyl-4,4'-diamine (1.6 parts), and an acid catalyst (0.5 part, Nacure 5225 from King Industries) was dissolved in a solvent of 1-methoxy-2-propanol (13.8 parts). After filtering with a 0.45 μm PTFE filter, the solution was applied onto the photoreceptor surface and more specifically onto the charge transport layer, using cup coating technique, followed by thermal curing at 140° C. for 40 minutes to form an overcoat layer having a film thickness of 3 μm.

Example 4

A photoreceptor was fabricated by repeating the process as described in Example 3 except that 2,2-bis(4-hydroxyethyloxyphenyl) propane (binder A-2 as prepared according to Example 2) was used as the binder to prepare the overcoat.

Example 5

A photoreceptor was fabricated by repeating the process as described in Example 3 except that N,N-bis(4-hydroxymethylphenyl)-3,4-xylidine (H-4) was used as the charge transport component to prepare the overcoat.

Comparative Example

A control photoreceptor device was fabricated by repeating the process as described in Example 3 except that the overcoat layer.

Evaluation of Photoreceptor Performance

The electrical performance characteristics of the above prepared photoreceptors such as electrophotographic sensitivity and short term cycling stability were tested in a scanner. The scanner is known in the industry and equipped with means to rotate the drum while it is electrically charged and discharged. The charge on the photoconductor sample is monitored through use of electrostatic probes placed at precise positions around the circumference of the device. The photoreceptor devices are charged to a negative potential of 500 Volts. As the devices rotate, the initial charging potentials are measured by voltage probe 1. The photoconductor samples are then exposed to monochromatic radiation of known intensity, and the surface potential measured by voltage probes 2 and 3. Finally, the samples are exposed to an erase lamp of appropriate intensity and wavelength and any residual potential is measure by voltage probe 4. The process is repeated under the control of the scanner's computer, and the data is stored in the computer. The PIDC (photo induced discharge curve) is obtained by plotting the potentials at voltage probes 2 and 3 as a function of the light energy. The photoreceptor devices of Examples 3, 4 and 5 having the overcoat layer showed comparable PIDC characteristics as the control or Comparative Example device.

The electrical cycling performance of the photoreceptor was performed using a in-house fixture similar to a xerographic system. The photoreceptor device with the overcoat showed stable cycling of over 170,000 cycles in a humid environment (28° C., 80% RH).

The results indicated that applying the overcoat layer had minimal impact on the desired electrical performance characteristics of the photoreceptor devices.

The wear resistance for the above photoconductors was measured using an in-house accelerated testing fixture comprising a BCR (bias-charging roller) charging unit, an exposure unit, a toner developer unit, and a cleaning unit. The photoreceptor drum was set to rotate at about 88 RPM for 50,000 cycles. The thickness of the photoreceptor was measured at the beginning and at the end of the testing. The wear rate was estimated based on the thickness loss and was expressed in nanometer per kilocycle. The photoreceptor devices of Examples 3, 4 and 5 with the overcoat offers a wear rate of from 23 to about 32 nm/kc, as compared to the wear rate of about 90 nm/kc for the control. The wear rates described here illustrated that the overcoat layer possessed much improved wear resistance.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An overcoat layer composition for forming an imaging member, the overcoat layer composition comprising:

a charge transport component;

a melamine-formaldehyde curing resin; and an aromatic polyol binder of Ar-(L-OH)n, wherein Ar is aromatic hydrocarbon component having from about 6 to about 60 carbons, L is a divalent ether linkage having from about 2 to about 50 carbons, and n is an integer of from 2 to about 6, wherein Ar is an aromatic hydrocarbon component selected from the group consisting of:

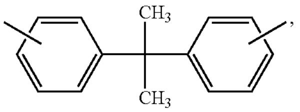,

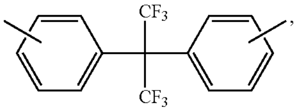,

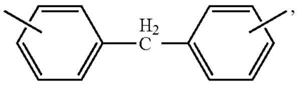,

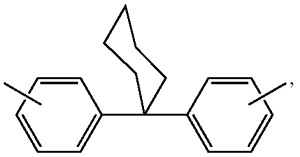,

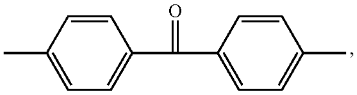,

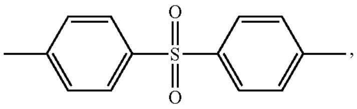,

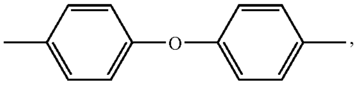,

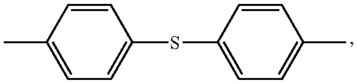,

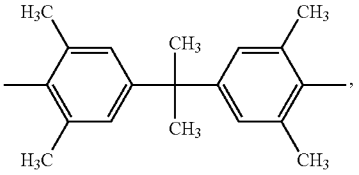,

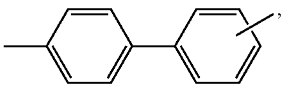,

-continued
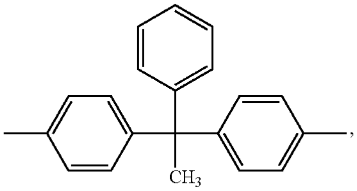
,
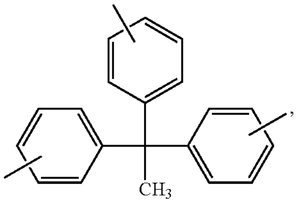
,
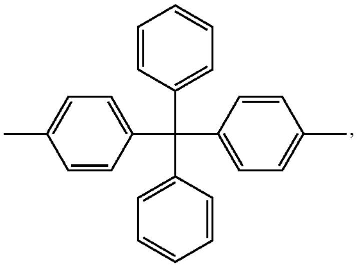
,
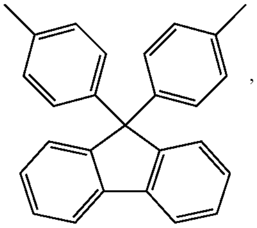
,
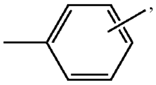
,
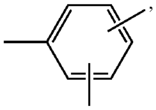
,
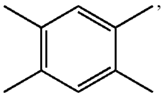
,
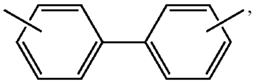
,
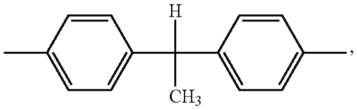
,
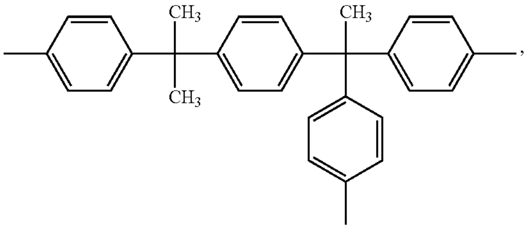
,
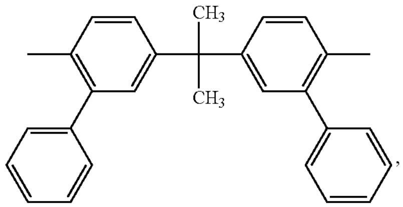
,
-continued
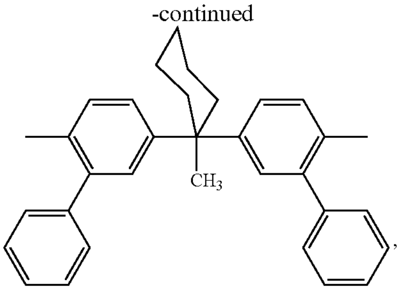
,
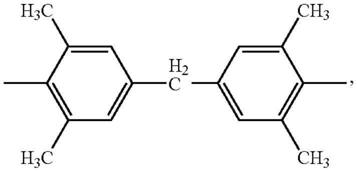
,
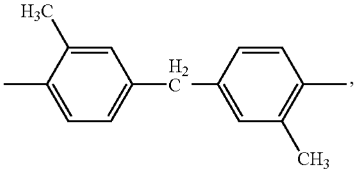
,
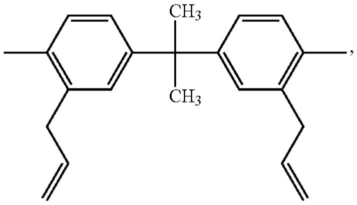
,
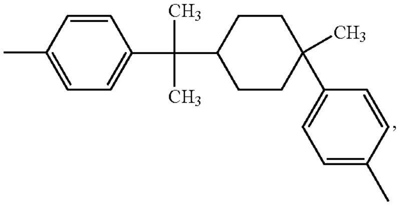
,
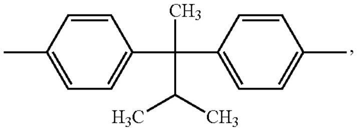
,
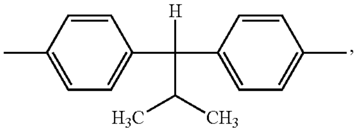
,
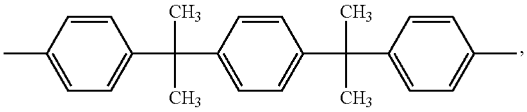
,
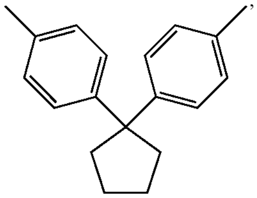
,
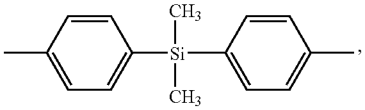
, -continued

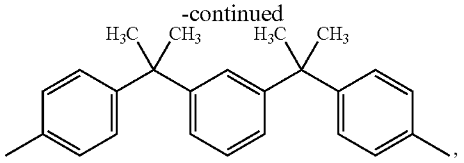

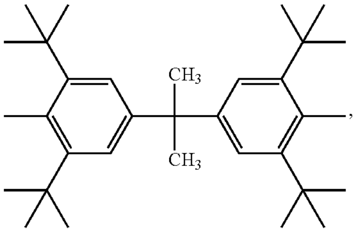

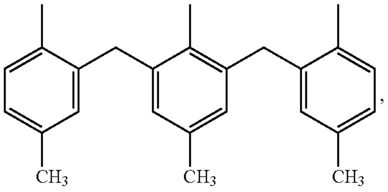

and

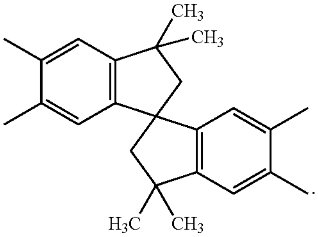

and the linkage group L is selected from the group consisting of:

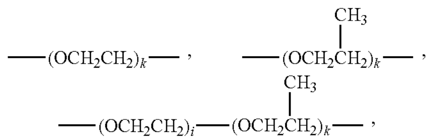

$-(OCH_2CH_2CH_2)_k-$, and $-(OCH_2CH_2CH_2CH_2)_k-$, wherein k and i are each an integer from 1 to about 10.

2. The overcoat layer composition of claim 1, wherein aromatic polyol binder is selected from the group consisting of

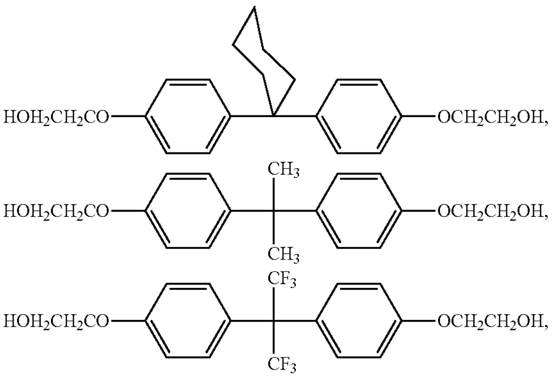

-continued

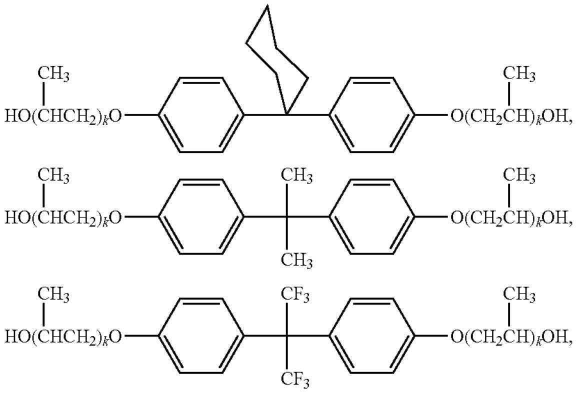

and mixtures thereof, and wherein k is an integer of from 1 to about 3.

3. The overcoat layer composition of claim 1, wherein the melamine-formaldehyde curing resin is selected from the group consisting of a melamine-form aldehyde resin, a guanamine-formaldehyde resin, and a melamine-phenol-formaldehyde resin.

4. The overcoat layer composition of claim 1, wherein the charge transport component is represented by the following general formula

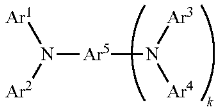

wherein $Ar^1$, $Ar^2$, $Ar^3$, $Ar^4$ and $Ar^5$ each independently represents a substituted or unsubstituted aryl group, or $Ar^5$ independently represents a substituted or unsubstituted arylene group and k represents 0 or 1, wherein at least one of $Ar^1$, $Ar^2$, $Ar^3$ and $Ar^4$ comprises a substituent selected from the group consisting of $-OH$, $-(CH_2)_mOH$, and $-CH_2OR$, m is an integer of from 1 to about 6, and R is an alkyl having from 1 to about 6 carbons.

5. The overcoat layer composition of claim 1, wherein the composition further comprises an acid catalyst comprised of an alkybenzenesulfonic acid or its amine masked derivative.

6. An imaging member comprising:

a substrate;

a charge generating layer disposed on the substrate;

a charge transport layer disposed on the charge generating layer; and an overcoat layer disposed on the charge transport layer, wherein the overcoat layer comprises a crosslinked product from an overcoat composition comprising a charge transport component, a melamine-formaldehyde curing resin, and an aromatic polyol binder of Ar-(L-OH)n, wherein Ar is aromatic hydrocarbon component having from about 6 to about 60 carbons, L is a divalent ether linkage having from about 2 to about 50 carbons, and n is an integer of from 2 to about 6, wherein Ar is an aromatic hydrocarbon component selected from the group consisting of:

-continued
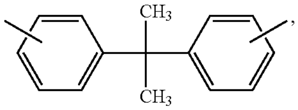
,
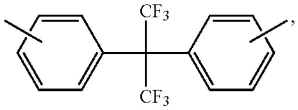
,
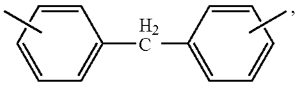
,
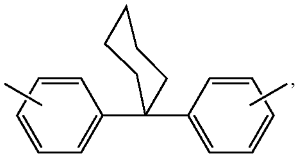
,
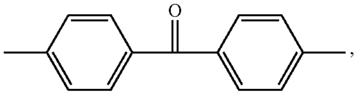
,
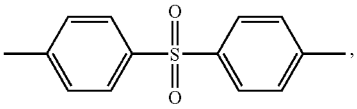
,
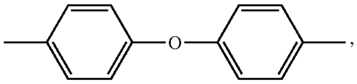
,
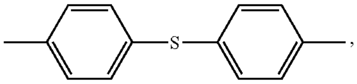
,
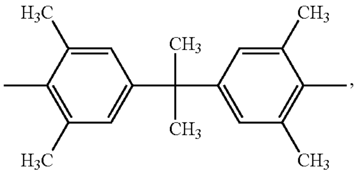
,
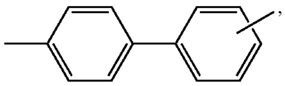
,
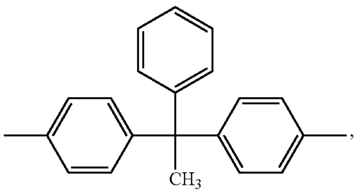
,
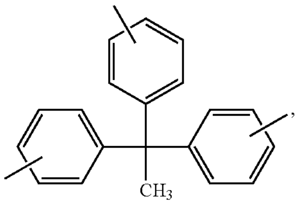
,
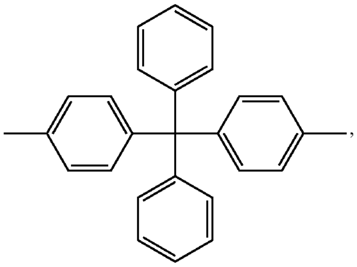
,
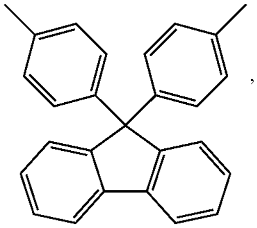
,
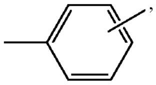
,
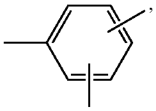
,
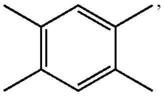
,
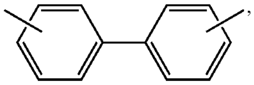
,
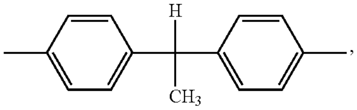
,
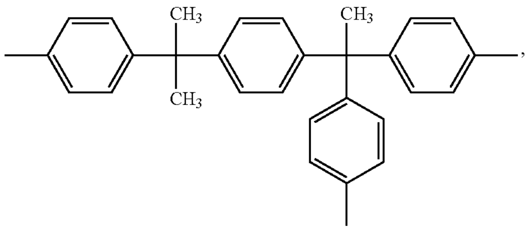
,
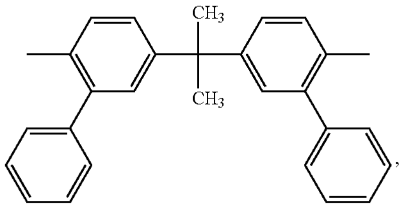
,
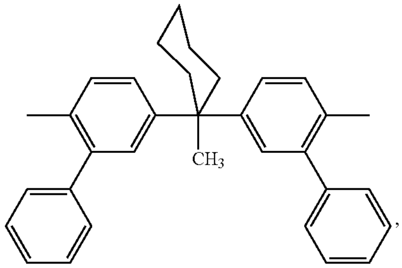
,
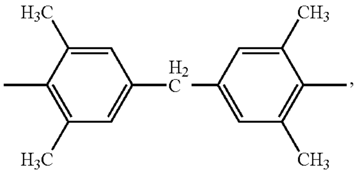
, -continued
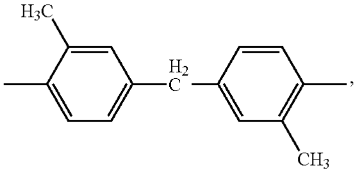
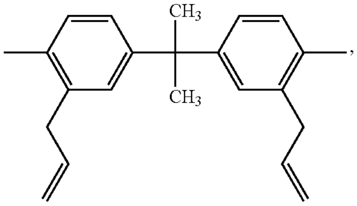
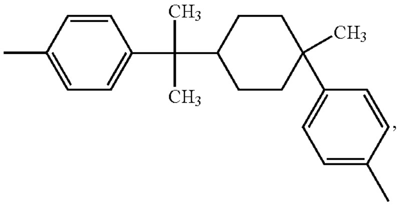
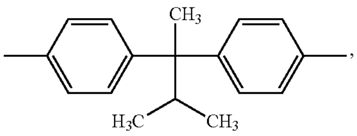
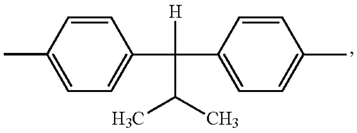
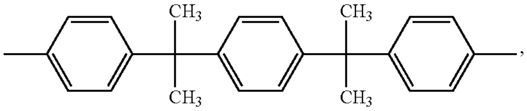
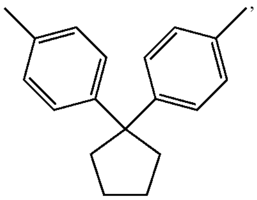
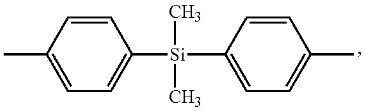
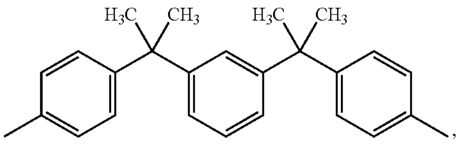
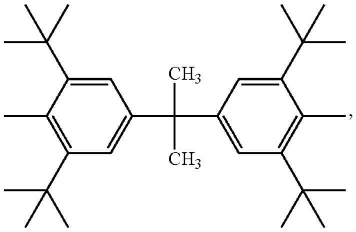
-continued
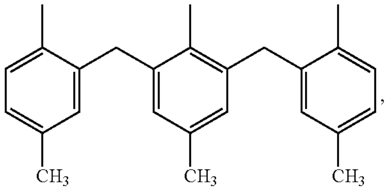
, and
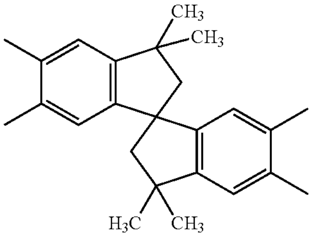
and the linkage group L is selected from the group consisting of:
$-(OCH_2CH_2)_k-$, $-(OCH_2\overset{CH_3}{\overset{|}{C}}H_2)_k-$,
$-(OCH_2CH_2)_k-(OCH_2\overset{CH_3}{\overset{|}{C}}H)_k$, $-(OCH_2CH_2CH_2)_k-$,
and
$-(OCH_2CH_2CH_2CH_2)_k-$,
wherein k and i are each an integer from 1 to about 10.
7. The imaging member of claim 6, wherein the aromatic polyol binder is selected from the group consisting of:
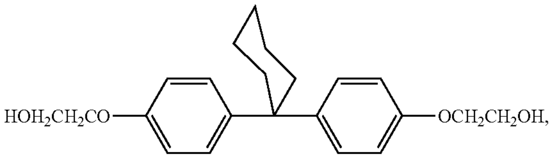
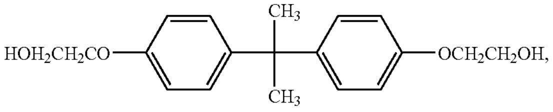
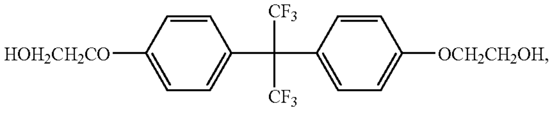
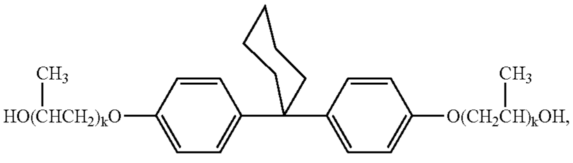
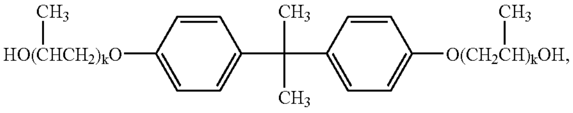

-continued

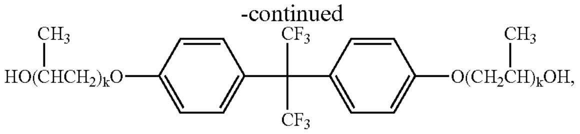

and mixtures thereof, and wherein k is an integer of from 1 to about 3.

8. The imaging member of claim 6, wherein the charge transport component is chemically bonded with the polymer matrix.

9. The imaging member of claim 6, wherein the charge transport component is represented by the following general formula

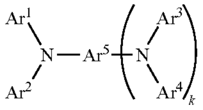

wherein $Ar^1$, $Ar^2$, $Ar^3$, $Ar^4$ and $Ar^5$ each independently represents a substituted or unsubstituted aryl group, or $Ar^5$ independently represents a substituted or unsubstituted arylene group and k represents 0 or 1, wherein at least one of $Ar^1$, $Ar^2$, $Ar^3$ and $Ar^4$ comprises a substituent selected from the group consisting of —OH, $-(CH_2)_mOH$, and $-CH_2OR$, m is an integer of from 1 to about 6, and R is an alkyl having from 1 to about 6 carbons.

10. The imaging member of claim 6, wherein the charge transport component is selected from the group consisting of:

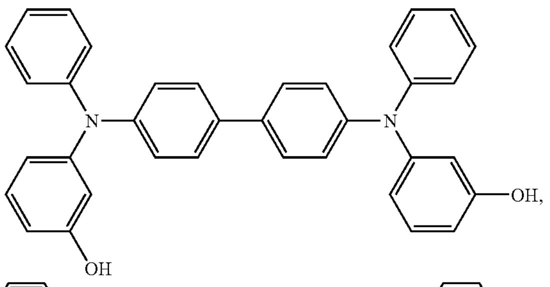

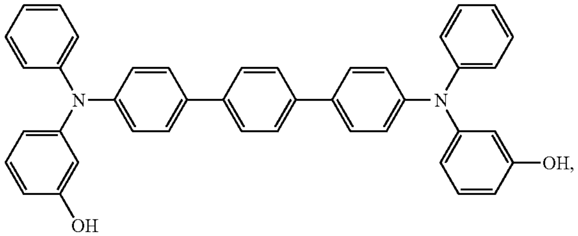

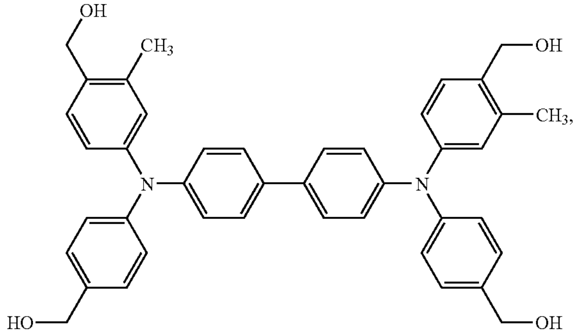

-continued

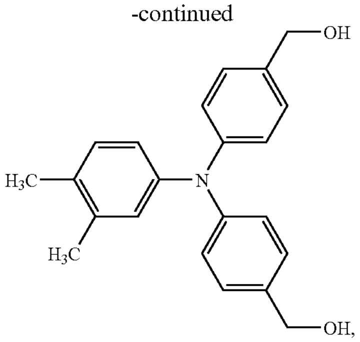

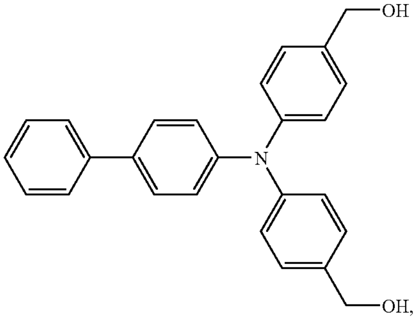

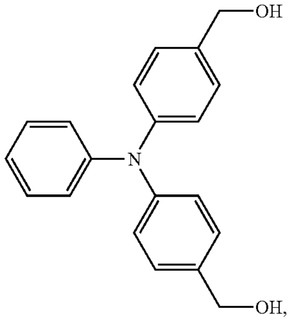

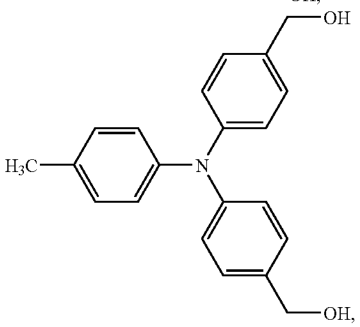

and mixtures thereof.

11. The imaging member of claim 6, wherein the melamine-formaldehyde curing resin is represented by the formula of

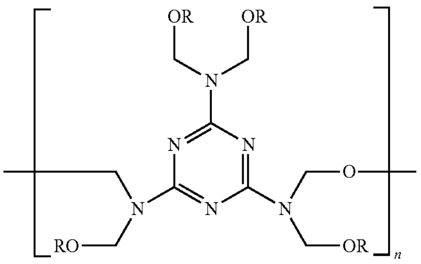

wherein R is selected from the group consisting of a hydrogen, a methyl, an ethyl, an propyl, a butyl, and mixtures thereof and n is the number of repeating unit selected from 1 to about 100.

12. The imaging member of claim 6, wherein the crosslinked product is realized by thermal curing in the presence of an acid catalyst comprised of an alkybenzenesulfonic acid or its amine masked derivative.

13. The imaging member of claim 6, wherein the charge transport component is present in an amount of from about 25 to about 85 percent by weight of the total weight of the overcoat layer.

14. The imaging member of claim 6, wherein the substrate comprises a metal cylinder or a metalized polymer, the charge generating layer comprises a photosensitive pigment and an optional polymer binder, and the charge transport layer comprises a polycarbonate polymer binder and at least one charge transport material comprised of a tertiary arylamine.

15. An imaging forming apparatus comprising:

a charging device;

a toner developer device;

a cleaning device; and a photoreceptor comprising a conductive substrate, a charge generation layer disposed on the substrate, a charge transport layer disposed on the charge generation layer, and an overcoat layer disposed on the charge generation layer, wherein the overcoat layer comprises a charge transport component and a polymer matrix comprised of a melamine-formaldehyde resin crosslinked with an aromatic polyol binder of Ar-(L-OH)n, wherein Ar is aromatic hydrocarbon component having from about 6 to about 60 carbons, L is a divalent linkage, and n is an integer of from 2 to about 6, wherein Ar is an aromatic hydrocarbon component selected from the group consisting of:

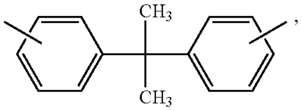,

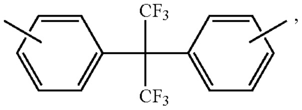,

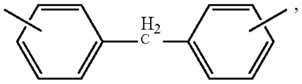,

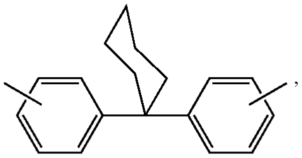,

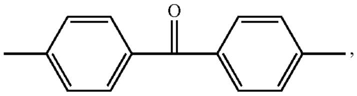,

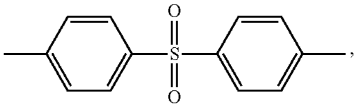,

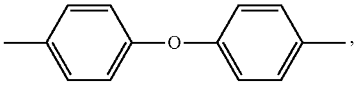,

-continued

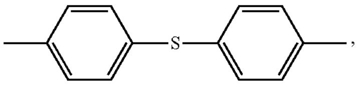,

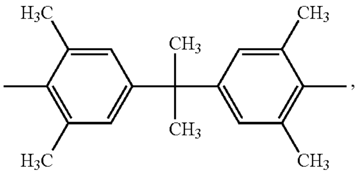,

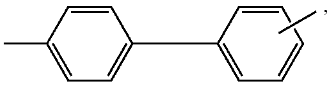,

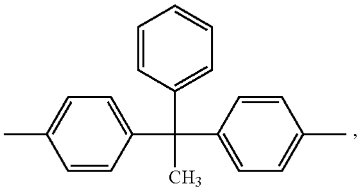,

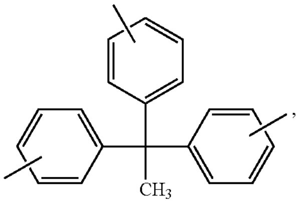,

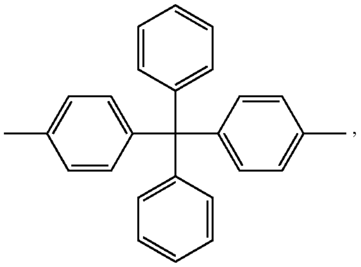,

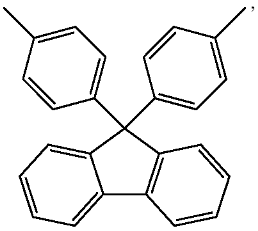,

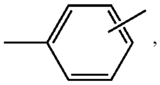, 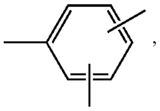, 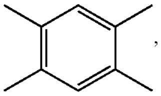,

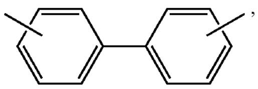,

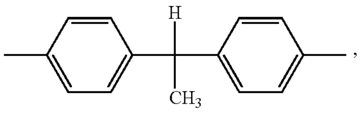,

-continued

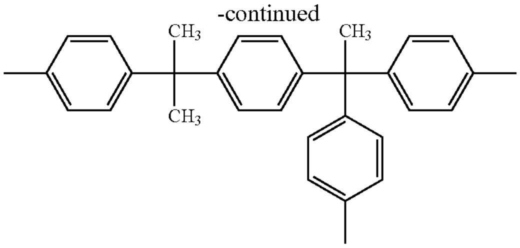

,

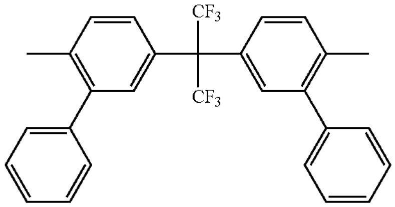

,

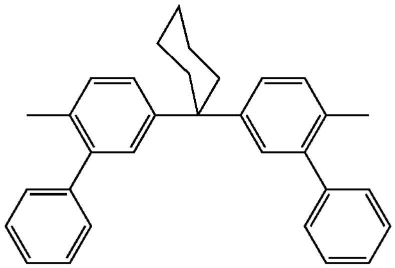

,

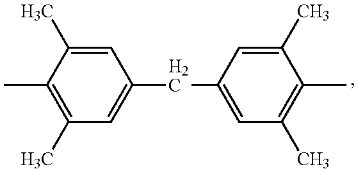

,

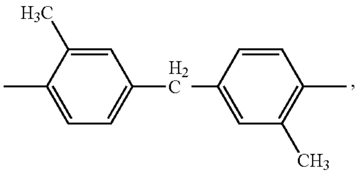

,

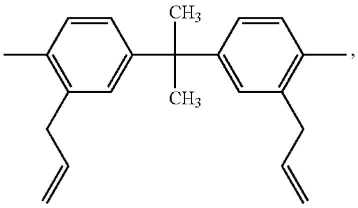

,

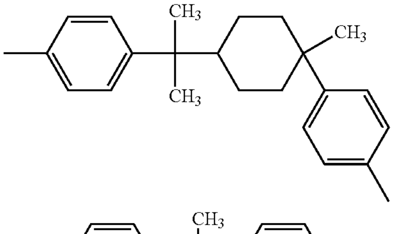

,

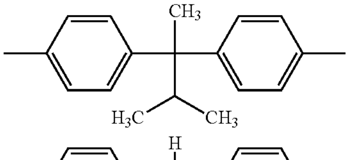

,

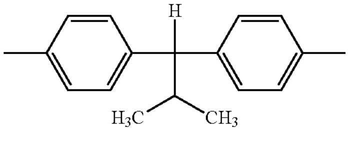

,

-continued

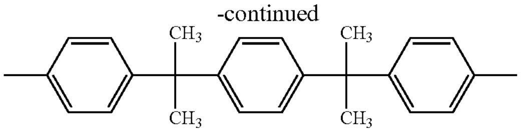

,

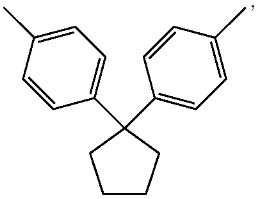

,

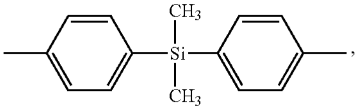

,

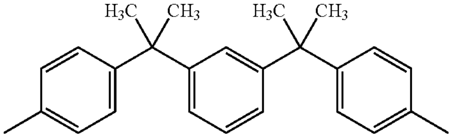

,

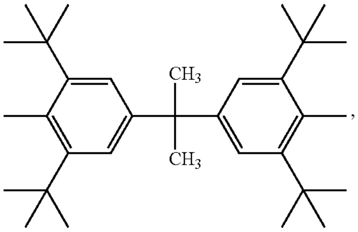

,

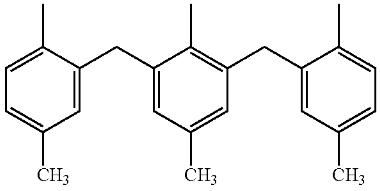

, and

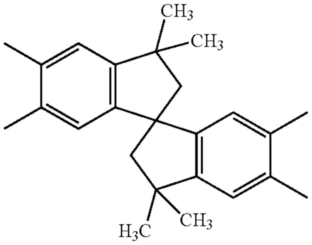

and the linkage group L is selected from the group consisting of:

$$-(OCH_2CH_2)_k-, \quad -(OCH_2CH(CH_3))_k-,$$

$$-(OCH_2CH_2)_l-(OCH_2CH(CH_3))_k-, \quad -(OCH_2CH_2CH_2)_k-, \text{ and}$$

$$-(OCH_2CH_2CH_2CH_2)_k-,$$

wherein k and are each an integer from 1 to about 10.

16. The imaging forming apparatus of claim 15, wherein the charging device is a biased charge roll and the photoreceptor possesses a wear rate of from about 5 to about 25 nanometers per kilocycle rotation.

17. The imaging forming apparatus of claim 15, wherein the charging device utilizes corona charging and the photoreceptor possesses a wear rate of from about 0.5 to about 10 nanometers per kilocycle rotation.

* * * * *